United States Patent
Wennerström

(10) Patent No.: US 9,919,587 B2
(45) Date of Patent: Mar. 20, 2018

(54) VEHICLE WITH IONIZING UNIT FOR CLEANING AIR TO CABIN

(71) Applicant: Blueair AB, Stockholm (SE)

(72) Inventor: Johan Wennerström, Sollentuna (SE)

(73) Assignee: BLUEAIR AB, Stockholm (SE)

( * ) Notice: Subject to any disclaimer, the term of this patent is extended or adjusted under 35 U.S.C. 154(b) by 142 days.

(21) Appl. No.: 15/013,460

(22) Filed: Feb. 2, 2016

(65) Prior Publication Data

US 2016/0229267 A1   Aug. 11, 2016

(30) Foreign Application Priority Data

Feb. 11, 2015   (EP) .................................... 15154669

(51) Int. Cl.
*B60H 3/00* (2006.01)
*B60H 3/06* (2006.01)
(Continued)

(52) U.S. Cl.
CPC ............. *B60H 3/0078* (2013.01); *B03C 3/06* (2013.01); *B03C 3/368* (2013.01); *B03C 3/41* (2013.01); *B03C 3/49* (2013.01); *B60H 3/06* (2013.01); *F24F 3/166* (2013.01); *B03C 2201/08* (2013.01); *B03C 2201/10* (2013.01); *B03C 2201/30* (2013.01); *F24F 2003/1682* (2013.01)

(58) Field of Classification Search
CPC combination set(s) only.
See application file for complete search history.

(56) References Cited

U.S. PATENT DOCUMENTS 2,290,376 A * 7/1942 Marshall ................. B60H 3/06
204/DIG. 6
3,738,088 A * 6/1973 Colosimo .......... B01D 46/0045
422/120
(Continued)

FOREIGN PATENT DOCUMENTS

DE    39 00139 A1    7/1990
DE    3900139 A1 *   7/1990   ............... B03C 3/10
(Continued)

OTHER PUBLICATIONS

Extended European Search Report dated Jul. 24, 2015, issued by the European Patent Office in the corresponding European Patent Application No. 15154669.4-1756. (7 pages).

*Primary Examiner* — Frank Lawrence
*Assistant Examiner* — Sonji Turner
(74) *Attorney, Agent, or Firm* — Buchanan Ingersoll & Rooney P.C.

(57) ABSTRACT

A vehicle is provided including a cabin, a conduit arranged to conduct a flow of air from outside the vehicle to the cabin, and a filter unit arranged to filter at least a portion of the flow of air before it enters the cabin. Further, an ionizing unit is arranged in the conduit upstream of the filter unit as seen in the direction of the flow of air so as to charge particles present in the flow of air and transmit at least a major part of the charged particles towards the filter unit. The at least one collector electrode has a tube-like shape arranged to conduct at least a portion of the flow of air, and the at least one emitter electrode is arranged at a central axis of the tube-like shaped collector electrode, whereby a more uniform ionization field is provided.

14 Claims, 2 Drawing Sheets

(51) Int. Cl.
*B03C 3/49* (2006.01)
*F24F 3/16* (2006.01)
*B03C 3/06* (2006.01)
*B03C 3/36* (2006.01)
*B03C 3/41* (2006.01)

(56) References Cited

U.S. PATENT DOCUMENTS

| | | | | |
|---|---|---|---|---|
| 4,223,598 A * | 9/1980 | Suzuki | | B03C 3/32 422/121 |
| 4,227,446 A * | 10/1980 | Sone | | B03C 3/017 422/121 |
| 4,376,637 A * | 3/1983 | Yang | | B03C 3/00 422/121 |
| 4,451,435 A * | 5/1984 | Holter | | B01D 53/0438 165/61 |
| 4,551,304 A * | 11/1985 | Holter | | B01D 53/0438 165/61 |
| 5,368,620 A * | 11/1994 | Chiba | | B03C 3/363 454/146 |
| 5,433,772 A * | 7/1995 | Sikora | | B03C 3/32 422/120 |
| 5,456,741 A * | 10/1995 | Takahara | | B03C 3/12 95/6 |
| 5,656,063 A * | 8/1997 | Hsu | | B01D 53/38 422/4 |
| 5,942,026 A * | 8/1999 | Erlichman | | F02M 25/12 123/198 E |
| 6,668,563 B2 * | 12/2003 | Mirowsky | | B64D 13/00 315/111.91 |
| 6,991,532 B2 * | 1/2006 | Goldsmith | | A61L 9/015 210/760 |
| 7,582,144 B2 * | 9/2009 | Krigmont | | B03C 3/025 55/DIG. 38 |
| 7,582,145 B2 * | 9/2009 | Krigmont | | B03C 3/025 55/DIG. 38 |
| 7,597,750 B1 * | 10/2009 | Krigmont | | B03C 3/014 55/DIG. 38 |
| 7,824,477 B2 * | 11/2010 | Kang | | B03C 3/82 313/351 |
| 8,092,577 B2 * | 1/2012 | Centanni | | B03C 3/41 422/122 |
| 8,157,901 B2 * | 4/2012 | Tiefenauer | | B01D 46/10 55/DIG. 12 |
| 8,837,106 B2 * | 9/2014 | Rais | | B60H 1/00564 361/230 |
| 8,889,079 B2 * | 11/2014 | Zahedi | | B01D 53/323 422/171 |
| 8,906,315 B2 * | 12/2014 | Brueck | | F01N 3/01 422/186.04 |
| 9,694,369 B2 * | 7/2017 | Engberg | | B03C 3/368 |
| 2005/0031503 A1 * | 2/2005 | Fox | | A61L 9/22 422/186.04 |
| 2005/0058582 A1 * | 3/2005 | Paumier | | B60H 3/0078 422/186.04 |
| 2013/0216440 A1 | 8/2013 | Brueck et al. | | |
| 2015/0075371 A1 * | 3/2015 | Abate | | B60H 3/0071 95/2 |
| 2015/0290657 A1 * | 10/2015 | Wright | | B03C 3/011 95/69 |
| 2016/0221004 A1 * | 8/2016 | Roux | | B03C 3/41 |

FOREIGN PATENT DOCUMENTS

| | | | | |
|---|---|---|---|---|
| EP | 0980290 B1 | 11/2005 | | |
| GB | 1559629 A * | 1/1980 | | B03C 3/019 |

* cited by examiner

VEHICLE WITH IONIZING UNIT FOR CLEANING AIR TO CABIN

FIELD OF THE INVENTION

The present invention generally relates to the field of vehicles. In particular, the present invention relates to vehicles with means for cleaning air to be delivered to a cabin of the vehicle.

BACKGROUND OF THE INVENTION

Air quality in vehicle cabins is an increasing concern due to high air pollution levels, in particular in large cities. Air to be delivered to the cabin is normally filtered in order to decrease the amount of hazardous particles in the air. It is known that charging particles before the filtering stage increases the particles' ability to adhere to the filter in case the filter comprises dielectric material and/or is pre-charged. US 2005/0058582 A1 discloses a vehicle comprising an electrostatic filtration system for cleaning air to be delivered via a conduit to a cabin of the vehicle. The electrostatic filtration system comprises an ionizing part for charging particles and a collecting part comprising a particle filter made from non-woven fibers. The ionizing part is positioned upstream of the collecting part. The ionizing part comprises a plurality of small-diameter electric wires disposed in alteration with parallel conductive plates.

SUMMARY OF THE INVENTION

It would be advantageous to achieve a vehicle capable of providing improved cleaning of air to be delivered to the cabin of the vehicle.

To better address one or more of these concerns, a vehicle having the features defined in the independent claim is provided. Preferable embodiments are defined in the dependent claims.

Hence, according to an aspect, a vehicle is provided. The vehicle comprises a cabin, a conduit arranged to conduct a flow of air from outside the vehicle to the cabin, and a filter unit arranged to filter at least a portion of the flow of air before it enters the cabin. Further, an ionizing unit is arranged in the conduit upstream of the filter unit as seen in the direction of the flow of air so as to charge particles present in the flow of air and transmit at least a major part of the charged particles towards the filter unit. The ionizing unit comprises at least one collector electrode and at least one emitter electrode. The filter unit comprises a filter medium adapted to attract at least some of the charged particles. Further, the at least one collector electrode has a tube-like shape arranged to conduct at least a portion of the flow of air, and the at least one emitter electrode is arranged at a central axis of the tube-like shaped collector electrode.

When the ionizing unit is in use, a voltage may be applied over the emitter electrode and the collector electrode, whereby an electric field is obtained between the emitter electrode and the collector electrode. Corona discharges occur at the emitter electrode, whereby molecules in the air get charged (ionized) and turn into ions. The ions travel in the electric field towards the collector electrode and collide with particles present in the air flow conducted by the collector electrode, whereby these particles get charged (ionized). In the present specification, the term "ionization field" will be used to indicate the field between the collector electrode and the emitter electrode where particles can be charged. The voltage applied over the emitter electrode and the collector electrode and the dimensions of the electrodes may preferably be adapted such that a major part of the particles that has been charged passes (are transmitted by) the collector electrode (instead of adhering to the collector electrode) and continues to travel to the filter unit, where at least some of the charged particles may adhere to the filter media of the filter unit.

As the collector electrode has a tube-like shape and the emitter electrode is arranged at a central axis of the collector electrode, a more uniform distance from the emitter electrode to the collector electrode is provided, which in turn provides a more uniform ionization field, whereby the charging of particles passing the ionizing unit is enhanced. Hence, more particles present in the air flow gets charged, which in turn increases the amount of particles adhering to the filter, whereby the air delivered to the cabin gets cleaner.

In the present specification, the term "tube-like shape" may include shapes with a generally circular outline of its cross-section. The diameter of the tube-like shape may vary along the central axis.

According to an embodiment, the ionizing unit may be arranged such that a major part, preferably at least 80%, such as at least 95%, of the total flow of air in the conduit is conducted by the collector electrode. Hence, a major part of the air may pass the ionization stage of the air cleaning process, whereby more particles get charged. As the ionization field provided by the tube-like shape of the collector electrode and the emitter electrode more uniformly fills up the space between the collector electrode and the emitter electrode, enhanced ionization may be maintained even if the air flow through the collector electrode is increased. For example, a blocking part may fill out most (or all) of the space between the collector electrode and an inner wall of the conduit.

According to an embodiment, the at least one collector electrode may have a circular cross-section, which makes the ionization field more uniform, which in turn increases the ionization rate (that is the amount of particles getting ionized compared to the total amount of particles passing the ionizing unit), whereby the air delivered to the cabin gets cleaner. It will be appreciated that slight variation from an exact circular shape may be envisaged.

According to an embodiment, the at least one collector electrode may have a cylindrical shape, whereby the ionization rate is further improved.

According to an embodiment, a ratio of the length of the collector electrode to the diameter of the collector electrode may be less than 1.2, preferably less than 1, such as less than 0.8. Hence, the length may be slightly longer than, substantially equal to, or shorter than the diameter of collector electrode. As the purpose of the collector electrode is not to collect (attract) charged particles, but merely to provide an ionization field together with the emitter electrode strong enough to charge the particles, the length of the collector electrode may be relatively short and its diameter (and thereby the distance between the emitter electrode and the collector electrode) may be relatively large. With the present embodiment, the ionizing unit may be more compact in size lengthwise and take up less space in the conduit, which is normally rather restricted in vehicles.

According to an embodiment, the at least one collector electrode may have a cross-section diameter comprised within the range of 40-200 mm, such as within the range of 50-100 mm.

The emitter electrode being positioned at the central axis of the collector electrode may include that a distance from the at least one emitter electrode to the central axis of the collector electrode is less than 5% of the radius of the collector electrode, whereby a more uniform ionization field is provided and the ionization is improved.

According to an embodiment, the ionizing unit may have an operating voltage comprised within the range of 3 to 10 kV. That is, the voltage (i.e. potential difference) applied over the emitter electrode and the collector electrode may be within the range of 3 to 10 kV (direct current, DC). This operating voltage range is adapted so as to provide an appropriate ionization field for charging particles. For example, the collector electrode may be connected to ground while the potential at the emitter electrode is −3 to −6 kVDC or +3 to +6 kVDC.

According to an embodiment, the at least one emitter electrode may comprise at least one tip arranged at the central axis of the tube-shaped collector electrode, whereby corona discharge from the emitter electrode is facilitated. Further, the tip of the emitter electrode may provide an appropriate ionization field together with the tube-like shaped collector electrode for charging particles passing but reduce the risk that the charged particles adhere to the collector electrode. As the ionization field gets shorter (seen in the direction of the central axis of the collector electrode) when using a tip electrode, the risk of charged particles adhering to the collector electrode is reduced. For example, the at least one emitter electrode may be a brush electrode or a needle tip electrode.

According to an embodiment, the conduit may comprise a recirculation air inlet for taking in air from the cabin for recirculation, wherein the ionizing unit may be arranged downstream of the recirculation air inlet as seen in the direction of the flow of air. The present embodiment is advantageous in that air being recirculated from the cabin also may pass the ionizing unit, whereby cleaning of the air being recirculated is enhanced.

According to an embodiment, the filter medium may include a dielectric material, such as polypropylene. Dielectric fibrous material may attract charged particles even if it is not pre-charged. When charged particles come close to the fibers of the dielectric filter medium, a polarization of the molecules of the fibers takes place. For example, if a particle having a positive charging comes close to a filter fiber, the molecule polarization gives an induced negative charge on the surface of the fiber. A fiber that comprises a lot of such polarized molecules will have a negative side and a positive side. Charged particles that pass through the filter unit, after chargings have been induced upon the surfaces of the fibers, will adhere to the fibers. This process is described in more detail in EP 0980290 B1 by the same applicant, which is hereby incorporated by reference.

The filter medium may be non-pre-charged or, alternatively, pre-charged and may in the latter case be referred to as an electret filter.

According to an embodiment, the vehicle may further comprise a fan arranged to obtain the flow of air in the conduit. For example, the fan may be located in the conduit, such as downstream of the filter as seen in the direction of the air flow.

It is noted that embodiments of the invention relates to all possible combinations of features recited in the claims.

BRIEF DESCRIPTION OF THE DRAWINGS

This and other aspects will now be described in more detail in the following illustrative and non-limiting detailed description of embodiments, with reference to the appended drawings.

All the figures are schematic, not necessarily to scale, and generally only show parts which are necessary in order to elucidate the embodiments, wherein other parts may be omitted. Like reference numerals refer to like elements throughout the description.

DETAILED DESCRIPTION OF EMBODIMENTS

Figure 1:
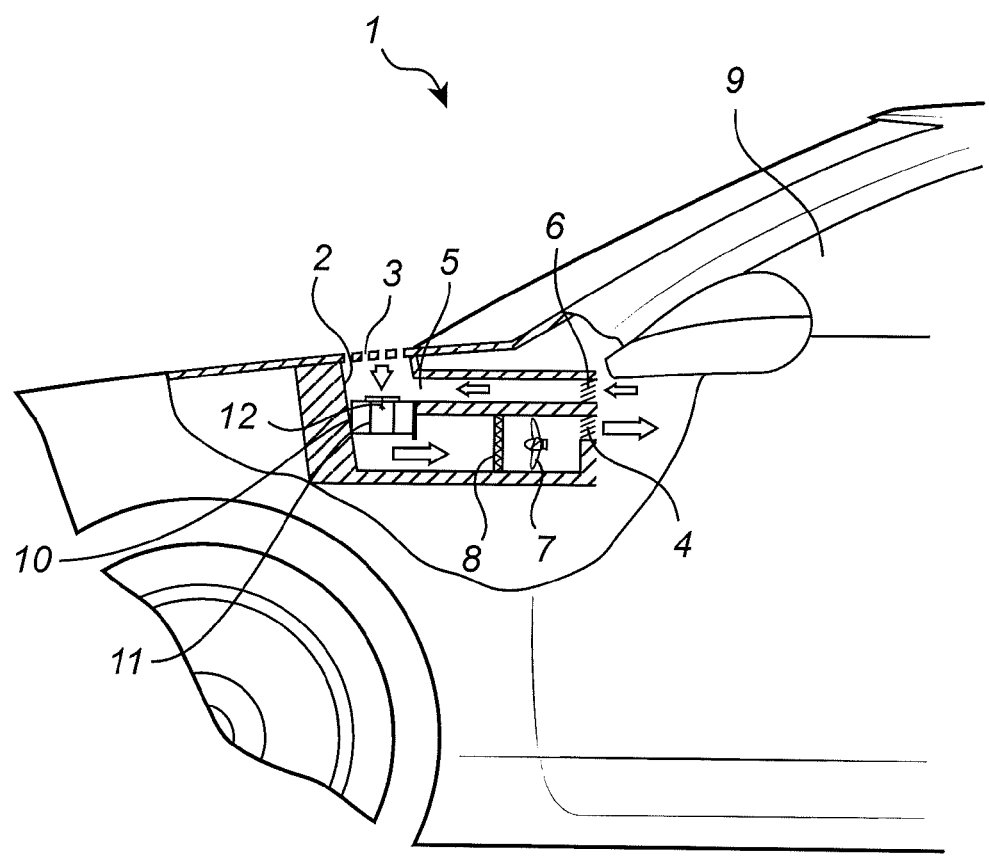
FIG. 1 shows a portion of a vehicle according to an embodiment.

A vehicle 1 according to an embodiment will be described with reference to FIG. 1. FIG. 1 is a schematic view of a portion of the vehicle 1. The vehicle 1 may e.g. be a car, truck or any other motorized vehicle. The vehicle 1 may comprise a conduit 2 (or duct) for delivering air from the outside the vehicle 1 to a cabin 9 of the vehicle 1. The conduit 2 may have an outside air inlet 3, which preferably may be provided with a grill to prevent coarse dirt from entering the conduit 2. The conduit 2 may further comprise an outlet 4 for admitting air into the cabin 9. Optionally, the conduit 2 may comprise a recirculation air inlet 5 for taking in air from the cabin 9 via a cabin air intake 6 for recirculation back to the cabin 9. A switching flap (not shown) may be arranged in the conduit 2 for selectively admitting air from the outside air inlet 3 and/or the recirculation air inlet 5.

In the conduit 2, an ionizing unit 10, a filter unit 8 and optionally a fan 7 may be arranged. The fan 7 may be arranged to provide a flow of air from the outside air inlet 3 and/or the cabin air intake 6 to the outlet 4, as indicated by arrows in FIG. 1. The ionizing unit 10 may be arranged upstream of the filter unit 5, as seen in the direction of the air flow. The fan 7 may be arranged at any suitable position in the conduit 2, but preferably downstream of the filter unit 8 for reducing the risk of the fan 7 getting dirty. Further, the ionizing unit 10 may preferably be arranged downstream of the recirculation air inlet 5. However, it may also be envisaged that the ionizing unit 10 may be arranged upstream of the recirculation air inlet 5.

The filter unit 8 may comprise a filter supported by a frame in the conduit 2. The filter may comprise a filter medium comprising a dielectric material, such as polypropylene. The filter may be non-pre-charged or pre-charged. Preferably, the filter unit 8 may cover (at least almost) the entire cross-section of the conduit 2 so as to filter most (or all) of the air passing in the conduit 2.

The ionizing unit 10 may comprise at least one collector electrode 11 and at least one emitter electrode 12 arranged to produce an ionization field for charging particles passing the ionizing unit 10.

Figure 2:
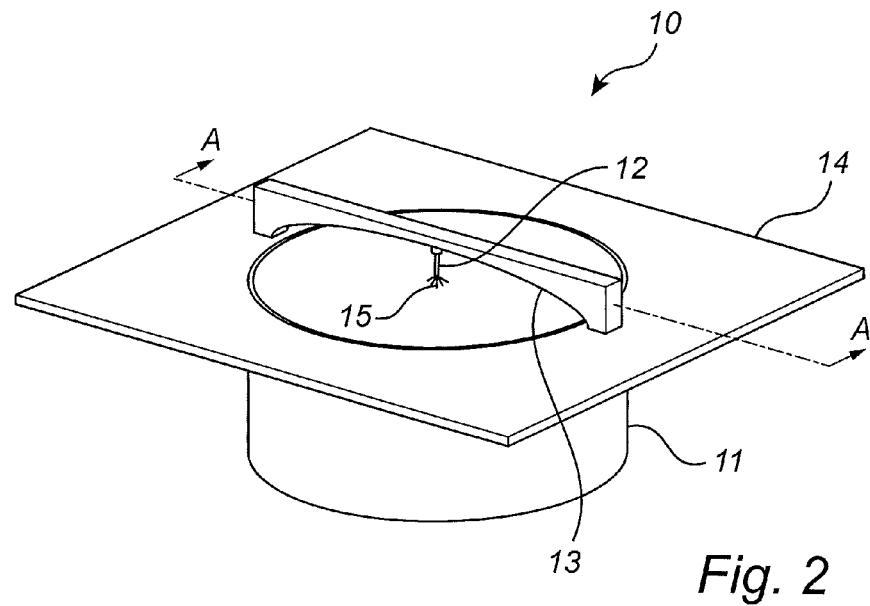
FIG. 2 shows an ionizing unit of the vehicle according to an embodiment.
Figure 3:
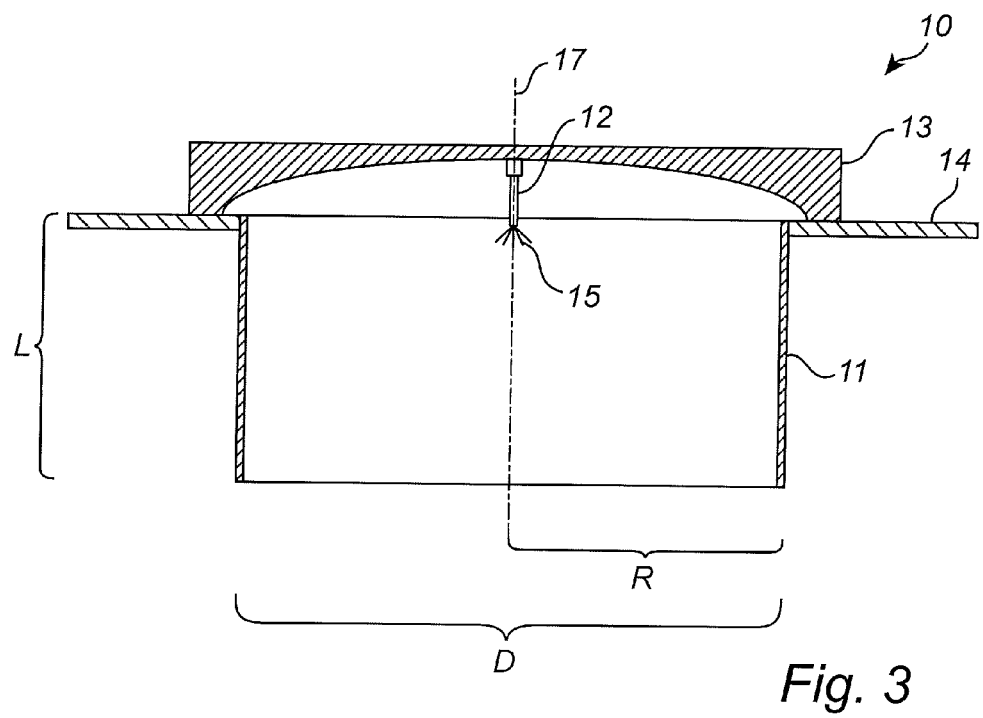
FIG. 3 is a cross-sectional view of the ionizing unit taken along line A-A in FIG. 2.

With reference to FIGS. 2 and 3, the ionizing unit 10 will be described in more detail. FIG. 2 is a perspective view of the ionizing unit 10 and FIG. 3 is a cross-section taken along line A-A in FIG. 2.

In the present example, the ionizing unit 10 comprises one pair of collector and emitter electrodes 11, 12. However, it will be appreciated that the ionizing unit 10 may comprise several, (e.g. three) pairs of collector and emitter electrodes 11, 12.

The collector electrode 11 may have a tube shape with a generally circular cross-sectional outline and a central axis 17 extending in a direction substantially perpendicular to the generally circular cross-section outline. The longitudinal extension of the tube shape along the central axis 17 may preferably be substantially straight, but a slightly curved shape may also be envisaged. The diameter of the cross-section of the collector electrode 11 may vary along the longitudinal axis 17. In the present example, the collector electrode 11 may be substantially cylindrical. A ratio of the length L of the collector electrode 11 to the diameter D of the collector electrode 11 may preferably be less than 1.2 and more preferably less than 1, such as less than 0.8. Further, the diameter D of the collector electrode 11 may be comprised within the range of 40-200 mm, such as within the range of 50-100 mm. The collector electrode 11 may e.g. be connected to ground.

The emitter electrode 12 may be centered approximately at the central axis 17 of the collector electrode 11. For example, the center of the emitter electrode 12 may be positioned at a distance corresponding to a maximum of 5% of the radius R of the collector electrode 11. The emitter electrode 11 may comprise at least one tip 15, which may be positioned approximately at the central axis 17 of the collector electrode 11. In the present example, the emitter electrode 12 is a brush electrode comprising a plurality of tips 15. Alternatively, the emitter electrode 12 may be a needle tip electrode. In the present example, the at least one tip 15 of the emitter electrode 12 is positioned close to an air inlet end of the collector electrode 11. However, the at least one tip 15 may be positioned anywhere along the central axis 17 such that it is surrounded by the collector electrode 11. The emitter electrode 12, and optionally its power cable, may be supported by a support structure 13. The support structure 13 may be have any appropriate shape for holding the emitter electrode 12 in place relative to the collector electrode 11 and for admitting air into the collector electrode 11.

The ionizing unit 10 may further comprise a blocking part 14 for filling up the space between the collector electrode 11 and an inner wall of the conduit 2 such that a majority, such as at least 80%, and preferably at least 95% of the total air flow in the conduit 2 passes through the collector electrode 11. In the present example, the blocking part 14 comprises a rectangular plate. However, any shape suitable for covering the space between the outer circumference of the collector electrode 11 and the inner wall of the conduit 2 may be envisaged.

With reference again to FIG. 1, operation of the air cleaning arrangement in the vehicle 1 according to an embodiment will be described. An air flow is produced, e.g. by the fan 7, that enters the conduit 2 via the outside air inlet 3. The air flow then passes the ionizing unit 10 by being conducted by the collector electrode 11. A voltage is applied over the emitter electrode 12 and the collector electrode 11, whereby an ionization field inside the collector electrode 11 is obtained. Particles present in the flow of air passing the ionization field are charged and then further transferred with the air flow out of the ionizing unit 10 to the filter unit 8, where at least most of the charged particles adhere to the filter of the filter unit 10. The air flow, now carrying a significantly reduced amount of particles, is then output in the cabin 9 via the outlet 4 of the conduit 2.

The person skilled in the art realizes that the present invention by no means is limited to the embodiments described above. On the contrary, many modifications and variations are possible within the scope of the appended claims.

Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measures cannot be used to advantage.

The invention claimed is:

1. A vehicle comprising:
   a cabin,
   a conduit arranged to conduct a flow of air from outside the vehicle to the cabin,
   a filter unit arranged to filter at least a portion of the flow of air before it enters the cabin, and
   an ionizing unit arranged in the conduit upstream of the filter unit as seen in the direction of the flow of air so as to charge particles present in said flow of air and transmit at least a major part of the charged particles towards the filter unit, the ionizing, unit comprising at least one collector electrode and at least one emitter electrode,
   wherein the filter unit comprises a filter medium adapted to attract at least some of the charged particles,
   wherein the at least one collector electrode has a tube-like shape arranged to conduct at least a portion of said flow of air,
   wherein the at least one emitter electrode is arranged at a central axis of the at least one tube-like shaped collector electrode, and
   wherein a ratio of a length of the at least one collector electrode to a diameter of the at least one collector electrode is less than 1.2.

2. The vehicle as defined in claim 1, wherein the ionizing unit is arranged such that a major part of a total flow of air in the conduit is conducted by the at least one collector electrode.

3. The vehicle as defined in claim 1, wherein the at least one collector electrode has a circular cross-section.

4. The vehicle as defined in claim 1, wherein the at least one collector electrode has a cylindrical shape.

5. The vehicle as defined in claim 1, wherein the at least one collector electrode has a cross-section diameter comprised within the range of 40-200 mm.

6. The vehicle as defined in claim 1, wherein a distance from the at least one emitter electrode to the central axis of the at least one collector electrode is less than 5% of the radius of the at least one collector electrode.

7. The vehicle as defined in claim 1, wherein the ionizing unit is adapted to operate within the range of 3 to 10 kV.

8. The vehicle as defined in claim 1, wherein the at least one emitter electrode comprises at least one tip arranged at the central axis of the at least one tube-shaped collector electrode.

9. The vehicle as defined in claim 1, wherein the at least one emitter electrode is a brush electrode or a needle tip electrode.

10. The vehicle as defined in claim 1, wherein the conduit comprises a recirculation air inlet for taking in air from the cabin for recirculation, wherein the ionizing unit is arranged downstream of the recirculation air inlet as seen in the direction of the flow of air.

11. The vehicle as defined in claim 1, wherein the filter medium includes a dielectric material.

12. The vehicle as defined in claim 1, further comprising a fan arranged to obtain said flow of air in the conduit.

13. The vehicle as defined in claim 1, wherein the ratio of the length of the at least one collector electrode to the diameter of the at least one collector electrode is less than 1.

14. The vehicle as defined in claim 1, wherein the ratio of the length of the at least one collector electrode to the diameter of the at least one collector electrode is less than 0.8.

* * * * *